United States Patent
Hummel et al.

(10) Patent No.: US 9,388,867 B2
(45) Date of Patent: Jul. 12, 2016

(54) BRAKE DUST COLLECTOR FOR MOTOR VEHICLES

(71) Applicant: MANN+HUMMEL GMBH, Ludwigsburg (DE)

(72) Inventors: Karl-Ernst Hummel, Bietigheim-Bissingen (DE); Nikolaus Moser, Ditzingen (DE); Michael Fasold, Auenwald (DE); Bernhard Huurdeman, Freiberg (DE); Markus Beylich, Ludwigsburg (DE); Andreas Beck, Kirchheim (DE); Andreas Franz, Ludwigsburg (DE); Andrew Glynn, Bad Schoenborn (DE); Michael Geiger, Freiberg (DE); Thomas Jessberger, Asperg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 79 days.

(21) Appl. No.: 14/010,691

(22) Filed: Aug. 27, 2013

(65) Prior Publication Data
US 2014/0054120 A1 Feb. 27, 2014

(30) Foreign Application Priority Data

Aug. 27, 2012 (DE) .......................... 10 2012 016 834

(51) Int. Cl.
*F16D 65/00* (2006.01)
*F16D 65/092* (2006.01)
*F16D 69/00* (2006.01)

(52) U.S. Cl.
CPC .......... *F16D 65/0031* (2013.01); *F16D 65/092* (2013.01); *F16D 69/00* (2013.01)

(58) Field of Classification Search
CPC . F16D 65/0031; F16D 65/029; F16D 65/847; F16D 69/00; F16D 55/22; F16D 2055/0037
USPC ...................................................... 188/218 A
See application file for complete search history.

(56) References Cited

U.S. PATENT DOCUMENTS

| | | | | |
|---|---|---|---|---|
| 1,830,530 A * | 11/1931 | Dewandre | ........................ | 303/54 |
| 2,181,008 A * | 11/1939 | Bonzack | ................... | 188/264 R |
| 2,299,796 A * | 10/1942 | Chase | ........................ | 188/264 R |
| 2,646,862 A * | 7/1953 | Dodge | ..................... | 188/264 W |
| 5,035,304 A * | 7/1991 | Bosch | .......................... | 188/71.1 |
| 5,162,053 A * | 11/1992 | Kowalski, Jr. | ............... | 55/385.3 |
| 5,772,286 A * | 6/1998 | Jordan | ..................... | 301/37.104 |
| 7,775,605 B2 * | 8/2010 | Henline | .................... | 301/64.303 |
| 2007/0000740 A1 * | 1/2007 | Raab | .......................... | 188/218 A |
| 2009/0265880 A1 * | 10/2009 | Jessberger | ....................... | 15/347 |

FOREIGN PATENT DOCUMENTS

| | | | | |
|---|---|---|---|---|
| DE | 9406795 U1 | 9/1994 | | |
| DE | EP1942287 | * 7/2008 | ................ | B60T 1/06 |
| DE | 202008009177 U1 | 11/2009 | | |
| DE | 202008009717 | * 12/2009 | ................ | B60T 1/06 |

* cited by examiner

*Primary Examiner* — Xuan Lan Nguyen
(74) *Attorney, Agent, or Firm* — James Hasselbeck

(57) ABSTRACT

A brake dust collector for a motor vehicle for collecting brake dust of a vehicle wheel brake has a dust collecting device that has at least one filter element and at least one filter element receptacle. The at least one filter element is secured in the at least one filter element receptacle. The at least one filter element receptacle is a through opening in a wheel rim; an intermediate space defined between the wheel rim and non-rotating vehicle parts; or a combination thereof.

10 Claims, 2 Drawing Sheets

BRAKE DUST COLLECTOR FOR MOTOR VEHICLES

CROSS REFERENCE TO RELATED APPLICATIONS

This application claims a priority date of Aug. 27, 2012, based on prior filed German patent application No. 10 2012 016 834.9, the entire contents of the aforesaid German patent application being incorporated herein by reference

BACKGROUND OF THE INVENTION

The invention concerns a brake dust collector for motor vehicles for collecting brake dust of a vehicle wheel brake in a collecting device that comprises at least one filter element and at least one filter element receptacle.

DE 10 2009 021 203 A1 discloses a brake dust collector for motor vehicles that serves for collecting brake dust of a vehicle wheel brake. The brake dust that is produced during braking is guided to a dust collecting device that is embodied as a filter element which is arranged at the radial outer edge of the brake disk and is extending across a defined angle section of the brake disk. The produced brake dust is exclusively accelerated by the rotational movement of the brake disk or by flows across the brake disk in the direction of the filter element where it is collected.

According to a variant described in DE 10 2009 021 203 A1, the filter element is received in a filter housing that serves for safely housing the filter element as well as for fastening on the brake caliper. The filter housing surrounds the U-shaped filter element that is placed onto the brake disk and forms together with the filter element a constructive unit which must be exchanged as a whole for service and maintenance purposes.

EP 2 102 522 B1 discloses a brake dust collector for a brake disk in which a housing covers a section of the brake disk; in the housing, a brake dust retaining device with several brake dust inlet openings is provided.

It is the object of the invention to provide with simple constructive measures an efficient and service-friendly brake dust collector for a brake system of a vehicle and a filter element that can be arranged in the brake dust collector.

SUMMARY OF THE INVENTION

In accordance with the present invention, this is achieved in that the filter element is secured in the filter element receptacle, wherein the filter element receptacle is formed by at least one through opening in the wheel of rim and/or an intermediate space between a wheel rim and non-rotating vehicle parts, in particular a wheel carrier or a vehicle wheel brake.

The filter element for collecting brake dust of a vehicle wheel brake is characterized in that the filter element can be arranged in a brake dust collector as disclosed and claimed.

In one embodiment, the filter element is received in a filter element receptacle formed by an intermediate space between the vehicle wheel brake and between the wheel rim and between the vehicle wheel brake and the wheel carrier.

The filter element arranged in the filter element receptacle is resting without contact on the inner diameter of the wheel rim well, wherein a circumferential gap between the wheel rim well and the filter element enables relative movement between wheel rim and filter element.

The filter element encloses the brake caliper partially or completely.

The outer circumference of the filter element is resting on the wheel rim well and a circumferential gap is formed between filter element and non-rotating vehicle parts, in particular a wheel carrier or a vehicle wheel brake.

The filter element is exchangeably arranged in the filter element receptacle. The filter element is a shaped filter.

The brake dust collector according to the invention can be used in motor vehicles for collecting brake dust that is produced upon actuation of the vehicle wheel brake.

The brake dust collector comprises at least one filter element and at least one filter element receptacle in which the filter element is secured.

The filter element receptacle is formed by at least one opening in the wheel rim and/or an intermediate space between wheel rim and non-rotating vehicle parts. While the wheel rim and the brake disk are rotating about the wheel axle, the wheel carrier and the vehicle wheel brake, comprising a brake caliper, a brake cylinder, and a brake pad, are stationarily arranged. With this type of encapsulation of the area surrounding the brakes, a discharge of brake dust into the environment is effectively prevented. The brake dust particle-containing air is caused to move by air swirls generated as a result of dynamic and thermal changes in the area about the wheel brake and is separated from the particles, as a result of the arrangement of the filter elements, upon exiting the area surrounding the vehicle wheel brake by passing through the filter element. Accordingly, only purified (filtered) air reaches the environment.

A single or several filter elements, arranged in a filter element receptacle, can be provided in various arrangements.

In a preferred embodiment, at least one filter element is connected fixedly by a filter element receptacle to the wheel rim and rotates therefore with the wheel rim about the wheel carrier. The air passages in the area of the exterior side of the wheel rim are closed off by the filter element.

The filter element can have a flat, plate-shaped form or, alternatively, can be a shaped filter, such a shaped filter having a predetermined stable three-dimensional shape, received in the filter element receptacle of the wheel rim. By means of a gap that is as small as possible, a so-called sealing gap, provided between the rotating filter element in the filter element receptacle and the components of the stationary wheel structure, exiting of particle-containing air into the environment is substantially prevented.

In addition or as an alternative, at least one individual filter element is connected fixedly with the wheel carrier or the vehicle wheel brake. In this embodiment, the wheel rim rotates about the stationary filter element. Advantageously, a disk-shaped filter element is provided to be disposed in the filter element receptacle, and has recesses for the wheel brake and optionally additional recesses for other components.

Depending on the mounting space that is available, it can be provided that at least one filter element receptacle is arranged in an intermediate space between the vehicle wheel brake and the wheel rim and one filter element receptacle is provided between the vehicle wheel brake and the wheel carrier. Due to mounting space limitations, it may be necessary to arrange a divided filter element about the wheel brake.

Advantageously, the filter element is positioned in a filter element receptacle without contact at the inner diameter of the wheel rim well of the wheel rim so that by a circumferential gap defined between the wheel rim well and the filter element receptacle or the filter element a relative movement between wheel rim and filter element receptacle or filter element is possible.

In a further advantageous embodiment, the vehicle wheel brake is enclosed completely or at least partially by the filter element. For this purpose, a shaped filter element with a negative form of the enclosed parts is secured in a filter element receptacle wherein no gap, or a gap that is at least minimal, between filter element and wheel brake prevents exiting of particle-containing air as much as possible.

In an advantageous embodiment, the radial outer boundary of the filter element is resting seal-tightly on the wheel rim well. A circumferentially extending sealing gap between filter element and non-rotating vehicle parts, in particular a wheel carrier or a vehicle wheel brake, prevents substantially exiting of particle-laden air into the environment.

In a particularly advantageous embodiment, the filter element is exchangeably insertable into the filter element receptacle so that, upon reaching a predetermined load state of the filter material, the filter element can be removed easily from the filter element receptacle and can be replaced with a new filter element.

A combination of the illustrated embodiment variants and arrangements of the filter element can be advantageously used depending on the application situation and the mounting space conditions. In particular, the filter element can be stationarily secured or can be arranged to rotate with the wheel rim. All proposed embodiments can be used individually or in any combination.

DESCRIPTION OF THE PREFERRED EMBODIMENTS

Figure 1:
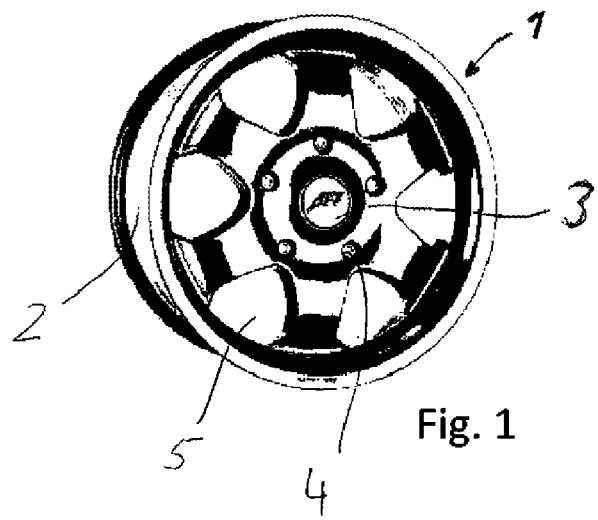
FIG. 1 shows in a perspective illustration a known wheel rim with passages between hub and wheel rim well.

In FIG. 1, a known wheel rim 1 of a motor vehicle (not illustrated) with a wheel rim well 2 is illustrated. The wheel rim well 2 is extending at a radial spacing about the wheel rim hub 3. The wheel rim 1 is connected at fastening points 4 to the wheel bearing 12 of the vehicle. On its end face, the wheel rim 1 has several through openings 5 distributed about the circumference which serve for venting the wheel brake 10. At least one radially outwardly extending member extends from the wheel rim hub 3 outwards to the circumferential rim well 2 portion of the wheel rim 1 and connects the wheel rim hub 3 to the circumferential rim well 2 portion of the wheel rim 1. As can be seen in FIG. 1, the through openings 5 may be arranged in the radially outwardly extending member.

Figure 2:
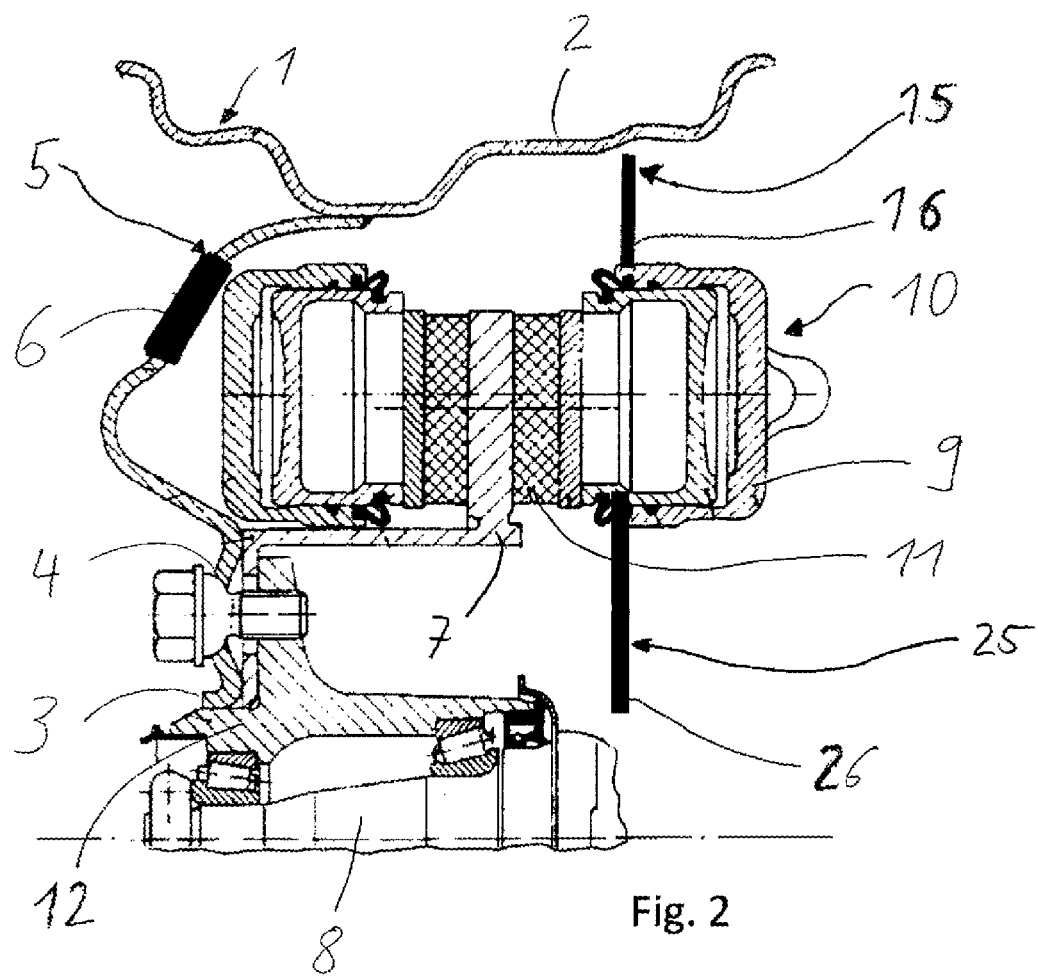
FIG. 2 shows a brake dust collector in a section illustration.

FIG. 2 shows in a section illustration a brake dust collector. On a wheel carrier 8, a wheel bearing 12 is mounted on which a brake disk 7 and the wheel rim 1 are attached at fastening points 4. On the wheel carrier 8, a vehicle wheel brake 10 is mounted which has a brake caliper 9 which, when the vehicle is to be decelerated, forces the brake pads 11 against the brake disk 7. Wheel carrier 8 and wheel brake 10 are arranged stationarily while the wheel bearing 12 and the wheel rim 1 rotate about the wheel carrier 8.

For collecting brake dust which is suspended in the air, a filter element 6 is received in the through opening 5 of the wheel rim 1 which forms a filter element receptacle. The filter element 6 closes off the through opening 5 of the wheel rim 1 relative to the side that is facing away from the vehicle. The particles that are produced upon braking are received in the filter element 6 because the air that is surrounding the brakes for venting the brakes passes through the filter element 6. Due to the filter element 6 being received in the though opening (the filter element receptacle) 5 that is fast with the wheel rim 1, the filter element 6 rotates with the wheel rim 1 about the wheel bearing axis. Preferably, all existing through openings 5 are closed off by filter elements 6.

In addition, on the side of the wheel rim brake 10 that is facing the vehicle, a filter element 16, 26 is arranged wherein the filter element 16, 26 is arranged in the filter element receptacle 15, 25 and connected to the wheel brake 10 or/and the wheel carrier 8 so that it does not rotate about the wheel bearing axis. In the area of the wheel brake 10, the filter element 16, 26 is arranged between the wheel carrier 8 and the brake caliper 9 and between the brake caliper 9 and the wheel rim well 2. Advantageously, the filter element 16, 26 inserted into the filter element receptacle 15, 25 is comprised of a disk which has recesses for the wheel brake 10 and optionally additional recesses for other components. The filter element 16 is positioned advantageously seal-tightly on the wheel rim well 2 wherein a relative movement between the rotating wheel rim 1 and the stationary filter element 16 is enabled in a contactless way by a small gap.

Figure 3:
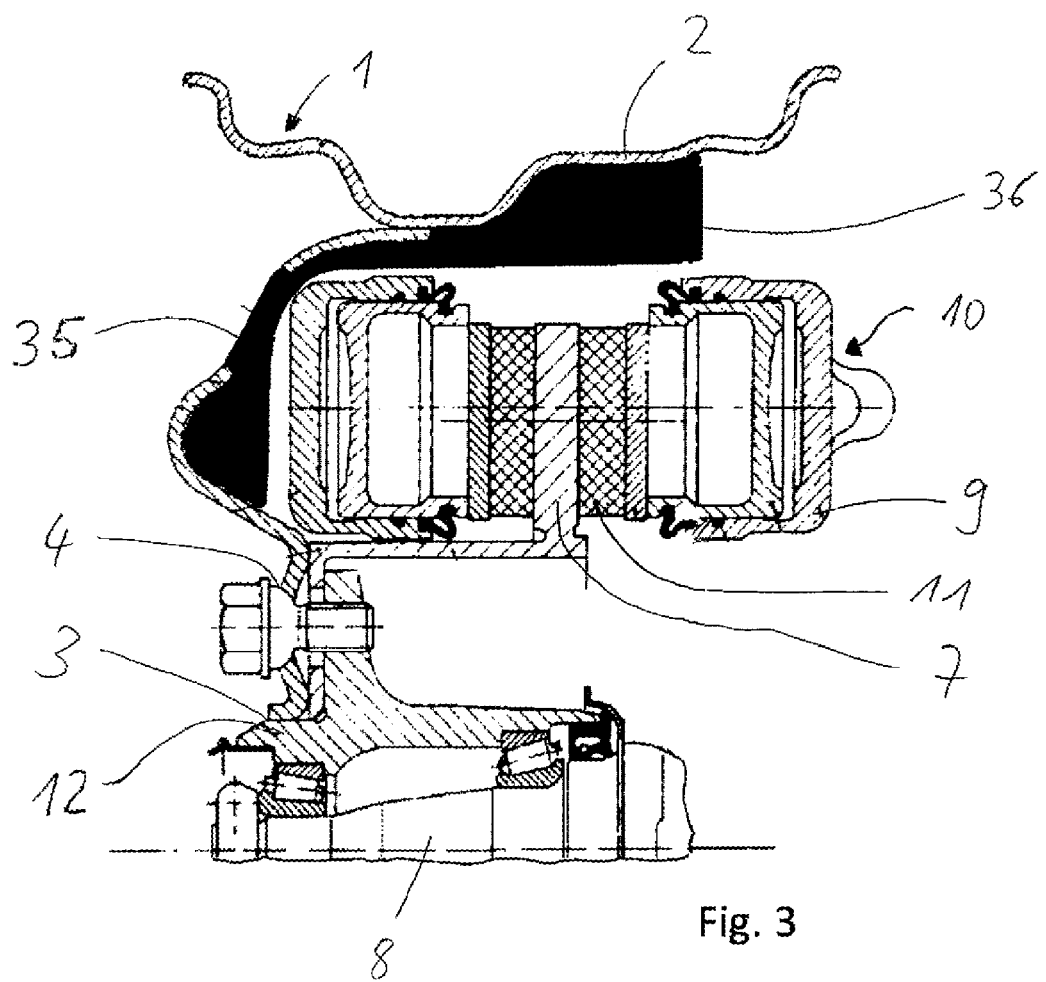
FIG. 3 shows an alternative brake dust collector with a shaped filter in a section illustration.

FIG. 3 shows in a section illustration an alternative brake dust collector in which the filter element 36 is a shaped filter. A shaped filter can be comprised, for example, of foam or a porous ceramic material and is shape-stable. The filter element 36 in a filter element receptacle 35 is matched at least in partial areas to the inner shape of the wheel rim 1 and fills out the interior between the rotating wheel rim 1 and the stationarily arranged vehicle wheel brake 10. The air diffuses as a result of the produced air swirls, caused by the movement of the vehicle and the wheel rim 1 as well as the relative movement between the wheel rim 1 and the wheel brake 10, through the filter element 36 so that the brake dust particles that are suspended in the air are separated.

The wheel rim 1 can have a closed contour or can be provided in an advantageous embodiment with several through openings through which the air can flow by passing through the filter element 36 and can exit to the exterior side of the wheel rim 1. In this context, the filter element 36 is designed such that it has projections which project into the through openings so as to close them off with the filter medium.

The filter element 36 can be designed as a disk which is attached in such a way on the inner side of the wheel rim 1 that the filter element 36 covers all through openings in the wheel rim 1. The receptacle for the filter element 36 is formed in this embodiment by the intermediate space between the wheel rim 1 and the vehicle wheel brake 10.

The filter element 6, 16, 26, 36 is received in a filter element receptacle 5, 15, 25, 35. Inasmuch as the filter element 6, 16, 26, 36 is designed as an exchangeable part (disposable part), the filter element 6, 16, 26, 36 can be removed in a simple way from the filter element receptacle 5, 15, 25, 35 and replaced with another filter element 6, 16, 26, 36.

While specific embodiments of the invention have been shown and described in detail to illustrate the inventive principles, it will be understood that the invention may be embodied otherwise without departing from such principles.

What is claimed is:

1. A brake dust collector for a motor vehicle for collecting brake dust of a vehicle wheel brake, the brake dust collector comprising:

a dust collecting device comprising at least one filter element and at least one filter element receptacle, wherein the at least one filter element is secured in the at least one filter element receptacle;

wherein the at least one filter element receptacle is selected from the group consisting of at least one through opening in a wheel rim;

wherein the wheel rim includes
- a wheel rim hub arranged on an axis of rotation of the wheel rim;
- a circumferential rim well portion of the wheel rim, the circumferential rim well portion arranged radially outwardly away from the wheel rim hub;
- at least one radially outwardly extending member extending from the wheel rim hub to the circumferential rim well portion of the wheel rim and connecting the wheel rim hub to the circumferential rim well portion of the wheel rim;

wherein the at least one filter element receptacle includes the at least one through opening extending through the at least one radially outwardly extending member of the wheel rim;

wherein some of the at least one filter element is received into respective ones of the at least one through opening of the wheel rim.

2. The brake dust collector according to claim 1, wherein non-rotating vehicle parts are selected from a wheel carrier on which the wheel rim hub is received and a vehicle wheel brake.

3. The brake dust collector according to claim 2, wherein the at least one filter element partially encloses a brake caliper of the vehicle wheel brake.

4. The brake dust collector according to claim 2, wherein the at least one filter element completely encloses a brake caliper of the vehicle wheel brake.

5. The brake dust collector according to claim 2, wherein an outer circumference of the at least one filter element is resting on a radially interior side of the wheel rim well and a circumferential gap is formed between the at least one filter element and the wheel carrier.

6. The brake dust collector according to claim 2, wherein an outer circumference of the at least one filter element is resting on the wheel rim well and a circumferential gap is formed between the at least one filter element and the vehicle wheel brake.

7. The brake dust collector according to claim 1, wherein an outer circumference of the at least one filter element is resting on the wheel rim well and a circumferential gap is formed between the at least one filter element and non-rotating vehicle parts.

8. The brake dust collector according to claim 1, wherein the at least one filter element is exchangeably arranged in the at least one filter element receptacle.

9. A filter element for collecting brake dust of a vehicle wheel brake, wherein
the filter element is arranged in a brake dust collector according to claim 1.

10. The filter element according to claim 9, wherein the filter element is a shaped filter.

* * * * *